United States Patent
Morioka (10) Patent No.: US 11,843,148 B2
(45) Date of Patent: Dec. 12, 2023

(54) FUEL CELL MEMBRANE ELECTRODE ASSEMBLY AND POLYMER ELECTROLYTE FUEL CELL

(71) Applicant: TOPPAN INC., Tokyo (JP)

(72) Inventor: Hiroyuki Morioka, Tokyo (JP)

(73) Assignee: TOPPAN INC., Tokyo (JP)

( * ) Notice: Subject to any disclaimer, the term of this patent is extended or adjusted under 35 U.S.C. 154(b) by 9 days.

(21) Appl. No.: 17/591,826

(22) Filed: Feb. 3, 2022

(65) Prior Publication Data
US 2022/0173419 A1    Jun. 2, 2022

Related U.S. Application Data

(63) Continuation of application No. PCT/JP2020/030470, filed on Aug. 7, 2020.

(30) Foreign Application Priority Data

Aug. 8, 2019  (JP) .................. 2019-146158
Aug. 8, 2019  (JP) .................. 2019-146159

(51) Int. Cl.
*H01M 8/1004* (2016.01)
*H01M 4/88* (2006.01)
*H01M 4/90* (2006.01)
*H01M 8/10* (2016.01)

(52) U.S. Cl.
CPC ......... *H01M 8/1004* (2013.01); *H01M 4/881* (2013.01); *H01M 4/9016* (2013.01); *H01M 2008/1095* (2013.01)

(58) Field of Classification Search
CPC ....... H01M 2008/1095; H01M 4/8652; H01M 4/8668; H01M 4/8673; H01M 4/881;
(Continued)

(56) References Cited

U.S. PATENT DOCUMENTS

2006/0068270 A1 *   3/2006   Ino ................. H01M 8/1004
                                                     429/492
2011/0294038 A1    12/2011   Kwon et al.
(Continued)

FOREIGN PATENT DOCUMENTS

EP     3 150 276 A1      4/2017
JP     H02-048632 B2    10/1990
(Continued)

OTHER PUBLICATIONS

International Searching Authority, "International Search Report," issued in connection with International Patent Application No. PCT/JP2020/030470, dated Oct. 20, 2020, 5 pages.
(Continued)

*Primary Examiner* — Victoria H Lynch
(74) *Attorney, Agent, or Firm* — Foley & Lardner LLP (57) ABSTRACT

A fuel cell membrane electrode assembly includes a polymer electrolyte membrane and a pair of electrocatalyst layers arranged to have the polymer electrolyte membrane therebetween, at least one of the pair of electrocatalyst layers includes particles supporting a catalyst which is composed of a noble metal component, a polymer electrolyte, and a fibrous oxide-based catalytic material, and the fibrous oxide-based catalytic material includes at least one transition metal element selected from a group consisting of Ta, Nb, Ti, and Zr.

20 Claims, 2 Drawing Sheets

(58) Field of Classification Search
CPC .. H01M 4/9016; H01M 4/926; H01M 8/1004; Y02E 60/50
See application file for complete search history.

(56) References Cited

U.S. PATENT DOCUMENTS

2012/0178018 A1   7/2012   Querner et al.
2019/0393528 A1   12/2019  Ozawa

FOREIGN PATENT DOCUMENTS

| JP | H05-036418 A | 2/1993 |
|---|---|---|
| JP | 2005-44659 A | 2/2005 |
| JP | 2005-63677 A | 3/2005 |
| JP | 2008-270176 A | 11/2008 |
| JP | 2019-083202 A | 5/2019 |
| WO | WO-2011/021034 A1 | 2/2011 |
| WO | WO-2011/036165 A1 | 3/2011 |

OTHER PUBLICATIONS

International Searching Authority, "Written Opinion," issued in connection with International Patent Application No. PCT/JP2020/030470, dated Oct. 20, 2020, 3 pages.

Extended European Search Report issued in corresponding European Patent Application No. 20850144.5, dated Jun. 5, 2023.

* cited by examiner

FIG.1

FIG.2

FUEL CELL MEMBRANE ELECTRODE ASSEMBLY AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/030470, filed on Aug. 7, 2020, which is based upon and claims the benefit of priority to Japanese Patent Application No. 2019-146158, filed on Aug. 8, 2019; and Japanese Patent Application No. 2019-146159, filed on Aug. 8, 2019; the disclosures of which are incorporated herein by reference in their entireties.

TECHNICAL FIELD

The present invention relates to fuel cell membrane electrode assemblies and polymer electrolyte fuel cells.

BACKGROUND

Fuel cells are power generation systems that generate electricity simultaneously with heat by causing a reaction that is the reverse of electrolysis of water on electrodes containing a catalyst, using a fuel gas containing hydrogen and an oxidant gas containing oxygen. Such a power generation system has characteristics such as high efficiency, low environmental load, and low noise compared with conventional power generation systems and is attracting attention as a future clean energy source. There are several types of fuel cells depending on the types of ion conductors used for the fuel cells, and fuel cells using proton-conducting polymer membranes are called polymer electrolyte fuel cells.

Among fuel cells, polymer electrolyte fuel cells, which can be used at around room temperature, are promising for use as in-vehicle power sources, stationary power sources for domestic use, or the like, and thus a variety of research and development have been performed in recent years. Polymer electrolyte fuel cells include a membrane electrode assembly (which may be termed MEA hereinafter) in which a polymer electrolyte membrane is located between electrocatalyst layers, and this membrane electrode assembly is further sandwiched between a pair of separators.

One of the separators includes gas channels through which a fuel gas including hydrogen is supplied to one of the electrodes, and the other separator includes gas channels through which an oxidant gas including oxygen is supplied to the other electrode.

Herein, the electrode to which a fuel gas is supplied is referred to as a fuel electrode, and the electrode to which an oxidant gas is supplied is referred to as an air electrode. These electrodes each include an electrocatalyst layer including a polymer electrolyte and carbon particles supporting a catalyst such as one of platinum-group metals (catalyst support particles), and a gas diffusion layer having gas permeability and electron conductivity. The gas diffusion layer of each of the electrodes is disposed so as to face the separator, that is, disposed between the electrocatalyst layer and the separator.

Some efforts have been made to enhance gas diffusion for electrocatalyst layers, to improve the output density of the fuel cells. One of the approaches relates to pores in electrocatalyst layers. Pores in an electrocatalyst layer are located to face the separator with the gas diffusion layer located in between and serve as passages for transporting multiple substances. In the fuel electrode, the pores not only contribute to smooth supply of a fuel gas to a three-phase interface that is a redox reaction site, but also contribute to water supply for smooth conduction of produced protons in the polymer electrolyte membrane. In the air electrode, the pores not only contribute to oxidant gas supply, but also contribute to smooth removal of water produced by an electrode reaction.

Existing polymer electrolyte fuel cells use expensive platinum as an electrocatalyst, and there is a strong demand for the development of alternative materials for widespread use of the polymer electrolyte fuel cells. In particular, the air electrode uses more platinum than the fuel electrode does. Thus, materials to replace platinum (non-platinum catalysts) that show high redox catalytic ability in the air electrode have been actively developed.

For example, PTL 1 discloses a mixture of a nitride of iron, which is a transition metal, and a noble metal as an example of the non-platinum catalyst in the air electrode. Additionally, PTL 2 discloses a nitride of molybdenum, which is a transition metal. Unfortunately, the catalytic materials disclosed in PTL 1 and PTL 2 have insufficient redox ability in an acid electrolyte. Additionally, such catalytic materials may sometimes be dissolved.

[Citation List] [Patent Literature] [PTL 1] JP 2005-44659 A; [PTL 2] JP 2005-63677 A.

SUMMARY OF THE INVENTION

Technical Problem

The present invention aims to provide a fuel cell membrane electrode assembly including electrocatalyst layers, which exhibits high power generation characteristics when used in a polymer electrolyte fuel cell.

Solution to Problem

To solve the above problems, a fuel cell membrane electrode assembly includes a polymer electrolyte membrane and a pair of electrocatalyst layers arranged to have the polymer electrolyte membrane located therebetween. At least one of the pair of electrocatalyst layers includes particles, a polymer electrolyte, and a fibrous oxide-based catalytic material, the particles supporting a catalyst which is composed of a noble metal component. The fibrous oxide-based catalytic material includes at least one transition metal element selected from Ta, Nb, Ti, and Zr.

To solve the above problems, a fuel cell membrane electrode assembly includes a polymer electrolyte membrane and a pair of electrocatalyst layers arranged to have the polymer electrolyte membrane located therebetween. At least one of the pair of electrocatalyst layers includes particles, a polymer electrolyte, a fibrous material having an average fiber length of 1 µm or more and 15 µm or less, and an oxide-based catalytic material, the particles supporting a catalyst which is composed of a noble metal component. The oxide-based catalytic material includes at least one transition metal element selected from a group consisting of Ta, Nb, Ti, and Zr.

To solve the above problems, a polymer electrolyte fuel cell includes the fuel cell membrane electrode assembly, a pair of gas diffusion layers arranged to have the fuel cell membrane electrode assembly located therebetween, and a pair of separators arranged to have the pair of gas diffusion layers located therebetween.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

First Embodiment

A first embodiment of the present disclosure will now be described with reference to the accompanying drawings.

The drawings are schematic, and the relationship between the thickness and the planar dimension, the ratio of the thicknesses between layers, and the like are not to scale. The embodiment described below is merely an example of the configurations for embodying the technical idea of the present disclosure, and the technical idea of the present disclosure does not limit the materials, shapes, structures, and the like of the components to those described below. The technical idea of the present disclosure can be modified in various ways within the technical scope defined in the claims.

[Membrane Electrode Assembly]

Figure 1:
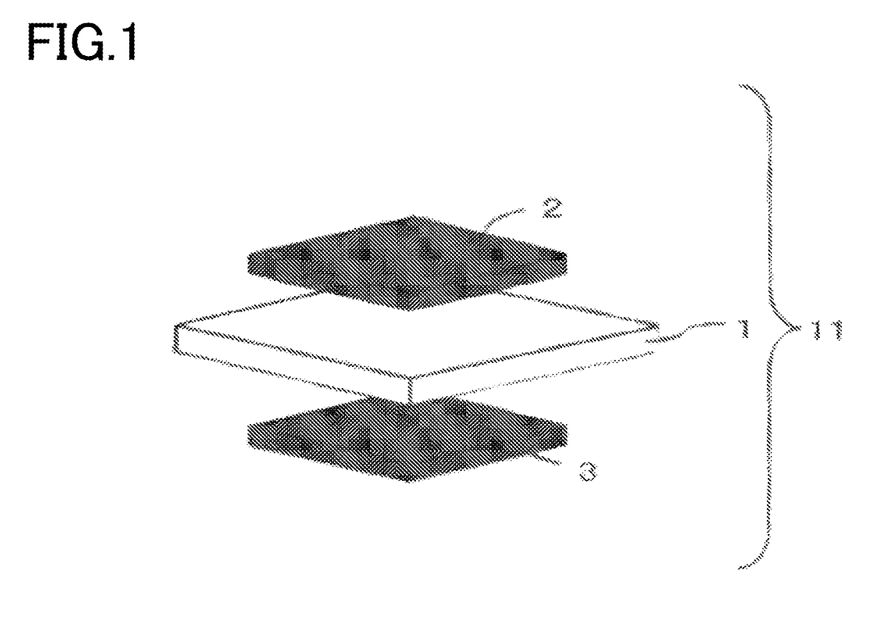
FIG. 1 is a schematic exploded perspective view illustrating a structure of a membrane electrode assembly including fuel cell electrocatalyst layers in a fuel cell membrane electrode assembly according to a first embodiment.

As shown in FIG. 1, a membrane electrode assembly 11 according to the present embodiment includes a polymer electrolyte membrane 1 and a pair of electrocatalyst layers 2 and 3 vertically sandwiching the polymer electrolyte membrane 1.

The electrocatalyst layers 2 and 3 include at least a polymer electrolyte and particles supporting a catalyst which is composed of a noble metal component. At least one of the pair of electrocatalyst layers 2 and 3 (hereinafter, also termed as a first electrocatalyst layer) includes a fibrous oxide-based catalytic material.

The fibrous oxide-based catalytic material contained in the first electrocatalyst layer includes at least one transition metal element selected from a group consisting of Ta, Nb, Ti, and Zr. The oxide-based catalytic material is preferably a material obtained by introducing phosphorus (P) to a nitride of the at least one transition metal element as a substitutional atom and partially oxidizing the nitride. More preferably, the at least one transition metal element is Ti. That is, the oxide-based catalytic material is composed of a material obtained by partially oxidizing a nitride of the at least one transition metal element including phosphorus (P) as a substitutional atom.

The fibrous oxide-based catalytic material preferably has an average fiber diameter of 20 nm or more and 1 μm or less and an average fiber length of 1.2 μm or more and 30 μm or less. The fibrous oxide-based catalytic material more preferably has an average fiber diameter of 80 nm or more and 200 nm or less and an average fiber length of 10 μm or more and 20 μm or less.

In the first electrocatalyst layer, the ratio (MB/MA) of the mass (MB) of the fibrous oxide-based catalytic material to the mass (MA) of a carrier in the particles supporting the catalyst is preferably 0.1 or more and 10 or less, and more preferably 0.5 or more and 3 or less.

In the first electrocatalyst layer, the ratio (MC/MA) of the mass (MC) of the polymer electrolyte to the mass (MA) of the carrier in the catalyst support particles is preferably 0.1 or more and 1.4 or less, and more preferably 0.5 or more and 1.0 or less.

In the first electrocatalyst layer, the particles supporting the catalyst composed of a noble metal component are preferably covered with a hydrophobic coating.

The inventor of the present application found that the first electrocatalyst layer configured as below has good drainage. The detailed mechanism for the first electrocatalyst layer to have good drainage is believed to be as follows. Note that the present invention is not constrained by the mechanism set forth below.

In the first electrocatalyst layer, the fibrous oxide-based catalytic material is entangled, thereby inhibiting the occurrence of cracking in the electrocatalyst layer, which may otherwise decrease the durability of the first electrocatalyst layer. This provides a first electrocatalyst layer having high durability and good mechanical properties. Additionally, the entanglement of the particles supporting the catalyst composed of a noble metal component and the fibrous oxide-based catalytic material forms pores in the electrocatalyst layer. When the polymer electrolyte fuel cell including the first electrocatalyst layer is driven in a high current range, the pores drain the water produced by an electrode reaction, which presumably enhances the diffusion of the reaction gas. When a non-fibrous oxide-based catalytic material is used, the particles supporting the catalyst composed of a noble metal component do not become entangled with the oxide-based catalytic material. Thus, the pores are less likely to be formed in the electrocatalyst layer. This hinders the drainage of the water produced by an electrode reaction. Consequently, when the polymer electrolyte fuel cell including the electrocatalyst layers is driven in a high current range, the diffusion of the reaction gas presumably cannot be enhanced.

A fibrous oxide-based catalytic material having an average fiber diameter of less than 20 nm presumably may hinder the formation of pores in the electrocatalyst layer due to the high flexibility of the oxide-based catalytic material. That is, when the average fiber diameter of the oxide-based catalytic material is 20 nm or more, it is possible to inhibit the flexibility of the oxide-based catalytic material from being excessively strong. This facilitates formation of the pores in the electrocatalyst layer.

The fibrous oxide-based catalytic material having an average fiber diameter exceeding 1 μm presumably may fail to be dispersed in an ink due to the high straightness of the oxide-based catalytic material. That is, when the oxide-based catalytic material has an average fiber diameter of 1 μm or less, the straightness of the oxide-based catalytic material is inhibited from being excessively high. This facilitates dispersion of the oxide-based catalytic material in the ink for forming the electrocatalyst layer.

The fibrous oxide-based catalytic material having an average fiber length of less than 1.2 μm presumably may impair the mechanical properties of the electrocatalyst layer. That is, the oxide-based catalytic material having an average fiber length of 1.2 μm or more inhibits impairing the mechanical properties of the electrocatalyst layer. The oxide-based catalytic material having an average fiber length exceeding 30 μm presumably may fail to be dispersed in an ink. That is, the oxide-based catalytic material having an average fiber length of 30 μm or less facilitates dispersion of the oxide-based catalytic material in the ink for forming the electrocatalyst layer.

When the mass of the fibrous oxide-based catalytic material is less than 0.1 times the mass of the carrier in the catalyst support particles, it presumably may be difficult to obtain a sufficient current due to low catalytic activity of the oxide-based catalytic material. That is, when the ratio of the mass of the oxide-based catalytic material to the mass of the carrier in the particles supporting the catalyst is 0.1 or more, the catalytic activity of the oxide-based catalytic material is inhibited from being decreased, which enables generation of a sufficient current.

When the above ratio exceeds 10, the current presumably may be decreased due to an increased thickness of the electrocatalyst layer. That is, when the ratio of the mass of the oxide-based catalytic material to the mass of the carrier in the particles supporting the catalyst is 10 or less, the thickness of the electrocatalyst layer is inhibited from being excessively increased, which inhibits a reduction in the current.

When the mass of the polymer electrolyte is less than 0.1 times the mass of the carrier in the catalyst support particles, it presumably may be difficult to obtain a sufficient current due to a decrease in the proton conductivity of the electrocatalyst layer. That is, when the ratio of the mass of the polymer electrolyte to the mass of the carrier in the particles supporting the catalyst is 0.1 or more, a decrease in the proton conductivity of the electrocatalyst layer is inhibited, which enables generation of a sufficient current.

When the above ratio exceeds 1.4, the diffusion of the reaction gas presumably may not be enhanced due to a decrease in the volume of the pores formed in the electrocatalyst layer. That is, when the ratio of the polymer electrolyte to the mass of the carrier in the particles supporting the catalyst is 1.4 or less, a decrease in the volume of the pores in the electrocatalyst layer is inhibited, which enhances the diffusion of the reaction gas.

According to the membrane electrode assembly 11 of the present embodiment, the power generation characteristics are not impaired by an increase in the interface resistance unlike in the case of using a conventional method of enhancing drainage by changing the configuration of the electrocatalyst layers. Accordingly, the polymer electrolyte fuel cell including the membrane electrode assembly 11 has enhanced power generation characteristics in a high current range where a large amount of water is produced compared with the polymer electrolyte fuel cell including a conventional membrane electrode assembly.

[Polymer Electrolyte Fuel Cell]

Figure 2:
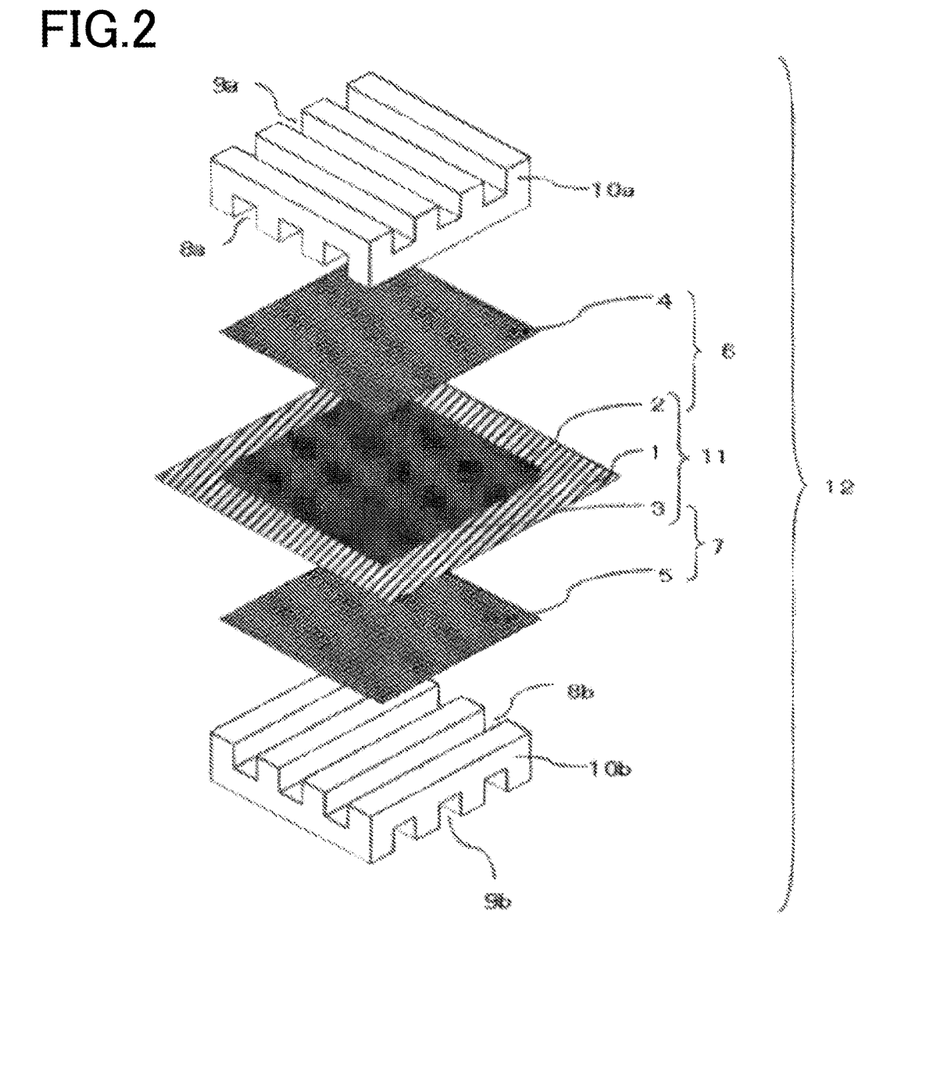
FIG. 2 is a schematic exploded perspective view illustrating a structure of a polymer electrolyte fuel cell including the membrane electrode assembly shown in FIG. 1.

Referring to FIG. 2, a polymer electrolyte fuel cell including the membrane electrode assembly 11 of the present embodiment will be described.

A polymer electrolyte fuel cell 12 shown in FIG. 2 includes a pair of gas diffusion layers 4 and 5. The gas diffusion layer 4 is located to face the electrocatalyst layer 2 of the membrane electrode assembly 11. The gas diffusion layer 5 is located to face the electrocatalyst layer 3. The electrocatalyst layer 2 and the gas diffusion layer 4 form an air electrode (cathode; positive electrode) 6. The electrocatalyst layer 3 and the gas diffusion layer 5 form a fuel electrode (anode; negative electrode) 7.

A pair of separators 10a and 10b are arranged outside the gas diffusion layers 4 and 5. That is, the membrane electrode assembly 11 is sandwiched between the pair of separators 10a and 10b in the thickness direction of the membrane electrode assembly 11. The separators 10a and 10b respectively include gas channels 8a and 8b for passing gas therethrough and cooling water channels 9a and 9b for passing cooling water therethrough. The separators 10a and 10b are made of a material having electrical conductivity and impermeability.

Hydrogen gas, for example, is supplied as a fuel gas to the gas channels 8b of the separator 10b facing the fuel electrode 7. Oxygen gas, for example, is supplied as an oxidant gas to the gas channels 8a of the separator 10a facing the air electrode 6. An electromotive force is generated between the fuel electrode 7 and the air electrode 6 by causing an electrode reaction between hydrogen in a fuel gas and oxygen in an oxidant gas in the presence of a catalyst.

In the polymer electrolyte fuel cell 12, the pair of separators 10a and 10b sandwich the polymer electrolyte membrane 1, the pair of electrocatalyst layers 2 and 3, and the pair of gas diffusion layers 4 and 5. The polymer electrolyte fuel cell 12 shown in FIG. 2 is an example of a fuel cell having a single-cell structure. However, the polymer electrolyte fuel cell may be configured by stacking a plurality of cells with the separators 10a or the separators 10b located in between.

[Method of Producing Electrocatalyst Layer]

Next, an example of a method of producing the first electrocatalyst layer will be described.

The first electrocatalyst layer is produced using a method including a first process and a second process described below. The first process is a process of producing a catalyst ink including catalyst support particles, an oxide-based catalytic material, a polymer electrolyte, and a solvent. The second process is a process of forming the first electrocatalyst layer by applying the catalyst ink obtained in the first process onto a substrate and drying the solvent. An electrocatalyst layer other than the first electrocatalyst layer, that is, a second electrocatalyst layer is produced by similar processes. Note that the second electrocatalyst layer does not include the fibrous oxide-based catalytic material included in the first electrocatalyst layer. The pair of electrocatalyst layers 2 and 3 produced is bonded to the opposed surfaces of the polymer electrolyte membrane 1 to obtain the membrane electrode assembly 11.

[Details]

Further details of the membrane electrode assembly 11 and the polymer electrolyte fuel cell 12 will be described.

Any membrane may be used as the polymer electrolyte membrane 1 as long as the membrane has proton conductivity. For example, a fluorinated polymer electrolyte membrane or a hydrocarbon polymer electrolyte membrane may be used. Examples of the fluorinated polymer electrolyte membrane include Nafion (registered trademark) manufactured by DuPont, Flemion (registered trademark) manufactured by Asahi Glass Co., Ltd., Aciplex (registered trademark) manufactured by Asahi Kasei Corporation, and Gore-Select (registered trademark) manufactured by Gore.

The hydrocarbon polymer electrolyte membrane may be formed of, for example, sulfonated polyether ketones, sulfonated polyether sulfones, sulfonated polyether ether sulfones, sulfonated polysulfides, or sulfonated polyphenylenes. In particular, materials based on Nafion (registered trademark) manufactured by DuPont are preferred to be used as the polymer electrolyte membrane 1.

The electrocatalyst layers 2 and 3 are formed on respective surfaces of the polymer electrolyte membrane 1 using the catalyst ink. The catalyst ink for the electrocatalyst layers 2 and 3 includes particles supporting a catalyst, a polymer electrolyte, and a solvent. The catalyst ink for the first electrocatalyst layer includes catalyst support particles, an oxide-based catalytic material, a polymer electrolyte, and a solvent.

The polymer electrolyte included in the catalyst ink may be any polymer electrolyte having proton conductivity. The polymer electrolyte may be made of the same material as the polymer electrolyte membrane 1. The polymer electrolyte may be made of, for example, a fluorinated polymer electrolyte or a hydrocarbon polymer electrolyte. Examples of fluorinated polymer electrolytes include materials based on Nafion (registered trademark) manufactured by DuPont. Examples of hydrocarbon polymer electrolytes include electrolytes such as sulfonated polyether ketones, sulfonated polyether sulfones, sulfonated polyether ether sulfones, sulfonated polysulfides, and sulfonated polyphenylenes. In particular, materials based on Nafion (registered trademark) manufactured by DuPont are preferred to be used as the fluorinated polymer electrolyte.

Examples of the catalyst composed of a noble metal component used in the present embodiment include metals, alloys, metal oxides, and complex metal oxides. Examples of the metals include one or more metals selected from a group consisting of platinum, palladium, ruthenium, iridium, and rhodium. The complex oxide herein refers to an oxide composed of two types of metals. Furthermore, the noble metal may include gold, silver, and platinum-group metals.

Furthermore, the average particle size of the above catalyst is preferably 0.5 nm or more and 20 nm or less, and more preferably 1 nm or more and 5 nm or less. The term "average particle size" here refers to an average particle size calculated from X-ray diffractometry for particles supporting the catalyst including the carrier, such as a carbon particle, and the catalyst supported by the carrier. For catalysts that are not supported by the carrier, the term "average particle size" refers to an arithmetic average particle size calculated from particle size measurement. Catalyst particles preferably have an average particle size of 0.5 nm or more and 20 nm or less because the catalyst activity and stability are improved in this range.

As an electron-conducting powder (carrier) supporting the above catalyst, carbon particles are generally used. The types of the carbon particles are not limited as long as the particles are microparticles and electrically conductive, and are not affected by the catalyst. Examples of the carbon particles include carbon black or graphite, activated carbon, carbon fibers, carbon nanotubes, and fullerenes.

The average particle size of the carbon particles is preferably 10 nm or more and 1,000 nm or less, and more preferably 10 nm or more and 100 nm or less. The term "average particle size" here refers to an average particle size calculated from an SEM image. The carbon particles preferably have an average particle size of 10 nm or more and 1,000 nm or less because the catalyst activity and stability are improved in this range. The carbon particles having an average particle size of 10 nm or more and 1,000 nm or less are preferred because electron conduction paths are more easily formed, and the gas diffusion and catalyst utilization ratio of the two electrocatalyst layers 2 and 3 are improved.

The catalyst support particles may be provided with a hydrophobic coating. In other words, the particles supporting the catalyst may be coated with a hydrophobic coating. In this case, the hydrophobic coating preferably has a thickness that allows the reaction gas to penetrate therethrough sufficiently. Specifically, the thickness of the hydrophobic coating is preferably 40 nm or less. A thickness greater than this may hinder supply of the reaction gas to the active site. The hydrophobic coating having a thickness of 40 nm or less imparts hydrophobicity to the catalyst support particles since the reaction gas sufficiently penetrates through the hydrophobic coating.

The hydrophobic coating that coats the catalyst support particles is preferred to be thick enough to sufficiently repel produced water. Specifically, the hydrophobic coating preferably has a thickness of 2 nm or more. The hydrophobic coating having a thickness less than this may cause the produced water to be retained and hinder supply of the reaction gas to the active site. That is, the hydrophobic coating having a thickness of 2 nm or more inhibits the produced water from being retained, which inhibits hindering supply of the reaction gas to the active site.

The hydrophobic coating that coats the catalyst support particles may be formed of, for example, a fluorine compound having at least one polar group. Examples of the polar group include a hydroxyl group, alkoxy group, carboxyl group, ester group, ether group, carbonate group, and amide group. The presence of the polar group immobilizes the fluorine compound on the outermost surface of the electrocatalyst layer. The portion of the fluorine compound other than the polar group portion is preferred to have a structure formed of fluorine and carbon from the perspective of achieving high hydrophobicity and chemical stability. However, the structure of the above portion is not limited to this as long as the hydrophobic coating has sufficient hydrophobicity and chemical stability.

In the present disclosure, the oxide-based catalytic material may be material containing at least one element selected from a group consisting of Ta, Nb, Ti, and Zr. The oxide-based catalytic material is preferably used as a material replacing platinum in the electrocatalyst layer included in the air electrode, that is, the positive electrode.

More preferably, the oxide-based catalytic material may be a material obtained by introducing phosphorus (P) to a nitride of these transition metal elements as a substitutional atom and partially oxidizing the resultant material in the atmosphere containing oxygen. That is, the oxide-based catalytic material is a material obtained by partially oxidizing a transition metal nitride including phosphorus (P). In other words, the oxide-based catalytic material includes the transition metal atoms, nitrogen atoms, phosphorus atoms, and oxygen atoms. Note that in the transition metal nitride, some of the transition metal atoms have been replaced by phosphorus atoms.

More specifically, the oxide-based catalytic material is a material (TiONP) obtained by partially oxidizing, in an atmosphere including oxygen, the titanium nitride to which phosphorus (P) has been introduced as a substitutional atom (TiNP). In this case, in the titanium nitride (TiN), some of the titanium atoms have been replaced by phosphorus atoms. Additionally, some of the titanium nitride is oxidized.

There is no particular limitation on the solvent used as the dispersion medium of the catalyst ink as long as the solvent does not erode the catalyst support particles, oxide-based catalytic material, or the polymer electrolyte and is capable of dissolving the polymer electrolyte in a highly fluid state or dispersing the polymer electrolyte as fine gel. However, the solvent is preferred to include at least a volatile organic solvent. The solvent used as the dispersion medium of the catalyst ink may be, for example, alcohols, ketone solvents, ether solvents, and polar solvents. Examples of the alcohols may include methanol, ethanol, 1-propanol, 2-propanol, 1-butanol, 2-butanol, isobutyl alcohol, tert-butyl alcohol, and pentanol. Examples of the ketone solvents may include acetone, methyl ethyl ketone, pentanone, methyl isobutyl ketone, heptanone, cyclohexanone, methylcyclohexanone, acetonylacetone, and diisobutyl ketone. Examples of the ether solvents may include tetrahydrofuran, dioxane, diethylene glycol dimethyl ether, anisole, methoxytoluene, and dibutyl ether. Examples of the polar solvents may include dimethylformamide, dimethylacetamide, N-methylpyrrolidone, ethylene glycol, diethylene glycol, diacetone alcohol, and 1-methoxy-2-propanol. The solvent may be a mixture of two or more of the above materials.

When a lower alcohol is used as the dispersion medium, the lower alcohol is preferred to be mixed with water because a dispersion medium composed of a lower alcohol has a high risk of ignition. Furthermore, the dispersion medium may include water that blends well with the polymer electrolyte, that is, water having a high affinity for the polymer electrolyte. The amount of water to be added to the dispersion medium is not particularly limited provided that the polymer electrolyte does not become dissociated and cause white turbidity or form a gel.

The catalyst ink may include a dispersant to disperse the catalyst support particles in the catalyst ink. Examples of the dispersant include an anionic surfactant, cationic surfactant, amphoteric surfactant, and nonionic surfactant.

Examples of the anionic surfactant include carboxylic acid type surfactants, such as alkyl ether carboxylate, ether carboxylate, alkanoyl sarcosine, alkanoyl glutamate, acyl glutamate, oleic acid/N-methyltaurine, potassium oleate/diethanolamine salt, alkyl ether sulfate/triethanolamine salt, polyoxyethylene alkyl ether sulfate/triethanolamine salt, amine salt of special modified polyether ester acid, amine salt of higher fatty acid derivative, amine salt of special modified polyester acid, amine salt of high molecular weight polyether ester acid, amine salt of special modified phosphate ester, high molecular weight polyester acid amidoamine salt, amidoamine salt of special fatty acid derivative, alkylamine salt of higher fatty acid, amidoamine salt of high molecular weight polycarboxylic acid, sodium laurate, sodium stearate, and sodium oleate; sulfonic acid type surfactants, such as dialkyl sulfosuccinate, dialkyl sulfosuccinate, 1,2-bis (alkoxycarbonyl)-1-ethanesulfonate, alkyl sulfonate, paraffin sulfonate, α-olefin sulfonate, linear alkylbenzene sulfonate, alkylbenzene sulfonate, polynaphthyl methanesulfonate, naphthalene sulfonate-formalin condensate, alkylnaphthalene sulfonate, alkanoyl methyltauride, lauryl sulfate ester sodium salt, cetyl sulfate ester sodium salt, stearyl sulfate ester sodium salt, oleyl sulfate ester sodium salt, lauryl ether sulfate ester salt, sodium alkylbenzene sulfonate, oil-soluble alkylbenzene sulfonate, and α-olefin sulfonate; sulfuric acid ester type surfactants, such as alkyl sulfuric ester salt, alkyl sulfate salt, alkyl sulfate, alkyl ether sulfate, polyoxyethylene alkyl ether sulfate, alkyl polyethoxysulfate, polyglycol ether sulfate, alkyl polyoxyethylene sulfate, sulfated oil, and highly sulfated oil; and phosphoric acid ester type surfactants, such as phosphoric acid (mono or di) alkyl salt, (mono or di) alkyl phosphate, (mono or di) alkyl phosphate ester salt, alkyl phosphate polyoxyethylene salt, alkyl ether phosphate, alkyl polyethoxy phosphate, polyoxyethylene alkyl ether, alkyl phenyl phosphate/polyoxyethylene salt, alkylphenyl ether/phosphate, alkylphenyl/polyethoxy/phosphate, polyoxyethylene/alkylphenyl/ether phosphate, higher alcohol phosphoric acid monoester disodium salt, higher alcohol phosphoric acid diester disodium salt, and zinc dialkyldithiophosphate.

Examples of the cationic surfactants include benzyldimethyl {2-[2-(P-1,1,3,3-tetramethylbutylphenoxy) ethoxy] ethyl} ammonium chloride, octadecylamine acetate, tetradecylamine acetate, octadecyltrimethylammonium chloride, beef tallow trimethylammonium chloride, dodecyltrimethylammonium chloride, coconut trimethylammonium chloride, hexadecyltrimethylammonium chloride, behenyltrimethylammonium chloride, coconut dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salt, 2-heptadecenyl-hydroxyethyl imidazoline, stearamide ethyldiethyl amine acetate, stearamide ethyl diethyl amine hydrochloride, triethanolamine monostearate formate, alkylpyridium salt, higher alkylamine ethylene oxide adduct, polyacrylamide amine salt, modified polyacrylamide amine salt, and perfluoroalkyl quaternary ammonium iodide.

Examples of the amphoteric surfactant include dimethylcocobetaine, dimethyllauryl betaine, sodium lauryl aminoethyl glycine, sodium lauryl aminopropionate, stearyldimethylbetaine, lauryl dihydroxyethyl betaine, amido betaine, imidazolinium betaine, lecithin, 3-[ω-fluoroalkanoyl-N-ethylamino]-1-sodium propanesulfonate, and N-[3-(perfluorooctane sulfonamide) propyl]-N, N-dimethyl-N-carboxymethylene ammonium betaine.

Examples of the nonionic surfactant include coconut fatty acid diethanolamide (1:2 type), coconut fatty acid diethanolamide (1:1 type), bovine fatty acid diethanolamide (1:2 type), bovine fatty acid diethanolamide (1:1 type), oleic acid diethanolamide (1:1 type), hydroxyethyl lauryl amine, polyethylene glycol laurylamine, polyethylene glycol coconut amine, polyethylene glycol stearylamine, polyethylene glycol beef tallow amine, polyethylene glycol beef tallow propylene diamine, polyethylene glycol dioleylamine, dimethyllaurylamine oxide, dimethylstearylamine oxide, dihydroxyethyllaurylamine oxide, perfluoroalkylamine oxide, polyvinylpyrrolidone, higher alcohol ethylene oxide adduct, alkylphenol ethylene oxide adduct, fatty acid ethylene oxide adduct, polypropylene glycol ethylene oxide adduct, fatty acid ester of glycerin, fatty acid ester of pentaerythrite, fatty acid ester of sorbitol, fatty acid ester of sorbitan, and fatty acid ester of sugar.

Of the surfactants mentioned above, the sulfonic acid type surfactants, such as alkylbenzene sulfonic acid, oil-soluble alkylbenzene sulfonic acid, α-olefin sulfonic acid, sodium alkylbenzene sulfonate, oil-soluble alkylbenzene sulfonate, and α-olefin sulfonate, are preferred as the dispersant in terms of the carbon dispersion effect, variation of catalytic performance due to residual dispersant, and the like.

Increasing the amount of the polymer electrolyte in the catalyst ink generally decreases the pore volume. Increasing the amount of the carbon particles in the catalyst ink increases the pore volume. The use of a dispersant decreases the pore volume.

The catalyst ink may be subjected to dispersion treatment, as necessary. The viscosity of the catalyst ink and the size of the particles in the catalyst ink can be controlled according to the conditions of the dispersion treatment of the catalyst ink. The dispersion treatment can be conducted using various devices. The dispersion treatment is not limited to a particular method. For example, the dispersion treatment may be a treatment using a ball mill and a roll mill, a treatment using a shear mill, a treatment using a wet mill, an ultrasonic dispersion treatment, or other treatments. Alternatively, the dispersion treatment may be conducted using a homogenizer or the like that stirs the catalyst ink by centrifugal force. As the dispersion time during which the catalyst ink is dispersed increases, the agglomeration of the catalyst support particles is destroyed, resulting in a decreased pore volume in the electrocatalyst layer formed using the catalyst ink.

An excessively large solid content of the catalyst ink increases the viscosity of the catalyst ink and easily causes cracking on the surfaces of the electrocatalyst layers 2 and 3. An excessively small solid content of the catalyst ink makes the film formation rate very slow and accordingly lowers the productivity. Therefore, the solid content of the catalyst ink is preferred to be 1 mass % (wt %) or more and 50 mass % or less. That is, the solid content of the catalyst ink being 1 mass % or more inhibits the film formation rate from being excessively slow, which prevents decreasing the productivity. The solid content of the catalyst ink being 50 mass % or less inhibits the viscosity of the catalyst ink from being excessively high, which inhibits the occurrence of cracking on the surfaces of the electrocatalyst layers 2 and 3.

The solid content in the catalyst ink includes the catalyst support particles, the oxide-based catalytic material, and the polymer electrolyte. Let us consider a first case where the amount of the catalyst support particles and the oxide-based catalytic material is greater than the amount of the polymer electrolyte in the solid content of the catalyst ink. In addition, let us consider a second case where the amount of the polymer electrolyte is greater than the amount of the catalyst support particles and the oxide-based catalytic material in the solid content of the catalyst ink. Even if the total amount of the solid content in the catalyst ink for the first case is the same as the total amount of the solid content in the catalyst ink for the second case, the viscosity of the catalyst ink for the first case is higher than the viscosity of the catalyst ink for the second case. Let us consider a third case where the amount of the catalyst support particles and the oxide-based catalytic material is less than the amount of the polymer electrolyte in the solid content of the catalyst ink. In addition, let us consider a fourth case where the amount of the polymer electrolyte is less than the amount of the catalyst support particles and the oxide-based catalytic material. Even if the total amount of the solid content in the catalyst ink for the third case is the same as the total amount of the solid content in the catalyst ink for the fourth case, the viscosity of the catalyst ink for the third case is lower than the viscosity of the catalyst ink for the fourth case. Accordingly, the ratio of the catalyst support particles and the oxide-based catalytic material to the solid content is preferred to be 10 mass % or more and 80 mass % or less. Furthermore, the viscosity of the catalyst ink is preferably about 0.1 cP or more and 500 cP or less (0.0001 Pa·s or more and 0.5 Pa·s or less), and more preferably 5 cP or more and 100 cP or less (0.005 Pa·s or more and 0.1 Pa·s or less). The viscosity of the catalyst ink can also be controlled by adding a dispersant when the catalyst ink is dispersed.

The catalyst ink may include a pore-forming agent. The pore-forming agent forms pores in the electrocatalyst layer by being removed after the formation of the electrocatalyst layer. The pore-forming agent may be a material that dissolves in an acid, an alkali, or water, a sublimating material, such as camphor, a thermally decomposable material, or the like. For example, when the pore-forming agent is a material that dissolves in warm water, the pore-forming agent may be removed from the electrocatalyst layer by water produced when the polymer electrolyte fuel cell including the electrocatalyst layer generates electricity.

Examples of the pore-forming agent that dissolves in an acid, an alkali, or water include acid-soluble inorganic salts, inorganic salts soluble in an alkaline aqueous solution, metals soluble in acids or alkalis, water-soluble inorganic salts, and water-soluble organic compounds. Examples of acid-soluble inorganic salts include calcium carbonate, barium carbonate, magnesium carbonate, magnesium sulfate, and magnesium oxide. Examples of inorganic salts soluble in an alkaline aqueous solution include alumina, silica gel, and silica sol. Examples of metals soluble in acids or alkalis include aluminum, zinc, tin, nickel, and iron. Examples of water-soluble inorganic salts include sodium chloride, potassium chloride, ammonium chloride, sodium carbonate, sodium sulfate, and monosodium phosphate. Examples of water-soluble organic compounds include polyvinyl alcohol and polyethylene glycol.

The pore-forming agents mentioned above may be used singly, or in combination of two or more. It is preferred, however, that they are used in combination of two or more.

As the method of coating the substrate with the catalyst ink, for example, doctor blading, dipping, screen printing, roll coating, or the like may be used.

As substrates used for producing the electrocatalyst layers 2 and 3, transfer sheets may be used. The transfer sheets used as the substrates only need to be formed of a material having good transfer performance. A fluororesin may be used as a material for forming the transfer sheets. Examples of fluororesins may include ethylene tetrafluoroethylene copolymer (ETFE), tetrafluoroethylene-hexafluoropropylene copolymer (FEP), tetrafluoroperfluoroalkyl vinyl ether copolymer (PFA), and polytetrafluoroethylene (PTFE). The substrates may be polymer sheets or polymer films. Examples of the material for forming the polymer sheets or the polymer films may include polyimide, polyethylene terephthalate, polyamide (Nylon (registered trademark)), polysulfone, polyethersulfone, polyphenylene sulfide, polyether ether ketone, polyetherimide, polyarylate, and polyethylene naphthalate. When transfer sheets are used as the substrates, electrocatalyst layers, that is, coating films from which the solvent has been removed, may be bonded to respective surfaces of the polymer electrolyte membrane 1, and then the transfer sheets may be separated from the electrocatalyst layers, thereby forming the membrane electrode assembly 11 provided with the electrocatalyst layers 2 and 3 on respective surfaces of the polymer electrolyte membrane 1.

The gas diffusion layers 4 and 5 may be formed of a material having gas diffusibility and electrical conductivity. For example, porous carbon materials, such as carbon cloth, carbon paper, and nonwoven fabric, may be used as the gas diffusion layers 4 and 5.

For the separators 10*a* and 10*b*, carbon or metal separators, or other separators may be used. It should be noted that the gas diffusion layers 4 and 5 may be integrated with the respective separators 10*a* and 10*b*. That is, the gas diffusion layer 4 may be formed integrally with the separator 10*a*, and the gas diffusion layer 5 may be formed integrally with the separator 10*b*. If the separators 10*a* and 10*b* or the electrocatalyst layers 2 and 3 serve as the gas diffusion layers 4 and 5, the gas diffusion layers 4 and 5 may be omitted. The polymer electrolyte fuel cell 12 is produced by assembling other accompanying devices such as a gas supply device and a cooling device, which are not shown.

Advantageous Effects and Others

The present embodiment as above describes the membrane electrode assembly 11 exhibiting high power generation characteristics under high humidification conditions, the method of producing the membrane electrode assembly 11, and the polymer electrolyte fuel cell 12 including the membrane electrode assembly 11. In the electrocatalyst layers 2 and 3 of the membrane electrode assembly 11 of the present embodiment, the entanglement of the fibrous oxide-based catalytic material inhibits the occurrence of cracking in the electrocatalyst layers, which would otherwise impair durability, thus achieving high durability and good mechanical properties thereof.

Furthermore, the entanglement of the catalyst support particles and the fibrous oxide-based catalytic material forms pores in the electrocatalyst layers. The pores of the electrocatalyst layers drain water produced by an electrode reaction in a high current range when the polymer electrolyte fuel cell is driven and enhance the diffusion of the reaction gas.

The membrane electrode assembly produced through the method of producing the electrocatalyst layer according to the present embodiment has improved drainage in a high current range where a large amount of water is produced without a hindrance to water retention under low humidification conditions and exhibits high power generation characteristics and durability even under high humidification conditions. Using the method of producing the electrocatalyst layer according to the present embodiment, the membrane electrode assembly as described above can be produced efficiently and easily in an economical manner (i.e., at a low cost).

In other words, the membrane electrode assembly described above is produced by forming the electrocatalyst layers using the catalyst ink obtained by dispersing a platinum-carrying carbon catalyst (catalyst support particles), that is, carbon particles supporting a platinum catalyst, a fibrous oxide-based catalytic material, and a polymer electrolyte in a solvent.

Accordingly, the membrane electrode assembly is produced without involving complicated production processes, and in addition, the use of the electrocatalyst layers produced through the above procedure improves both water retention and reaction gas diffusion. Thus, the electrocatalyst layers are produced without providing special means such as humidifiers, which consequently contributes to cost reduction.

Only one of the electrocatalyst layers 2 and 3 formed on respective surfaces of the polymer electrolyte membrane 1 may be the first electrocatalyst layer. In this case, as described above, the first electrocatalyst layer is preferably an electrocatalyst layer that serves as an air electrode (cathode), or a positive electrode, in which water is produced by an electrode reaction.

While the first embodiment of the present disclosure has been described in detail, the disclosure is not necessarily limited to the above embodiment. Modifications not departing from the scope and spirit of the present disclosure are encompassed by the present disclosure.

EXAMPLES

A description will be given of a method of producing the first electrocatalyst layer and the membrane electrode assembly for use in the polymer electrolyte fuel cell according to the present embodiment, through specific examples and comparative examples. The present embodiment should not be limited by the following examples and comparative examples.

In the following examples and comparative examples, the two electrocatalyst layers are both first electrocatalyst layers. As described above, only one of the two electrocatalyst layers may be the first electrocatalyst layer.

Example 1-1

[Preparation of Catalyst Ink]

A platinum-carrying carbon catalyst (catalyst support particles) with a loading density of 50 mass %, a fibrous oxide-based catalytic material (TiONP) having an average fiber diameter of 100 nm and an average fiber length of 15 μm, and a 25 mass % polymer electrolyte solution were mixed in a solvent and dispersed in the solvent using a planetary ball mill. The dispersion time was set to 30 minutes to prepare a catalyst ink. The composition ratio of the starting material in the prepared catalyst ink was set as follows. That is, the mass ratio between the carbon carrier, the oxide-based catalytic material, and the polymer electrolyte was set to 1:1.5:0.7. The solvent in the catalyst ink contained a mixture of ultrapure water and 1-propanol. The volume ratio between ultrapure water and 1-propanol in the solvent was set to 1:1. Further, the catalyst ink was prepared so that the solid content therein was 12 mass %.

[Substrate]

As a substrate constituting a transfer sheet, a polytetrafluoroethylene (PTFE) sheet was used.

[Method of Forming Electrocatalyst Layer on Substrate]

The prepared catalyst ink was applied to the substrate by doctor blading, followed by drying at 80° C. in atmospheric air. The amount of coating of the catalyst ink was controlled so that the platinum carried was 0.05 mg/cm$^2$ in the electrocatalyst layer serving as a fuel electrode (anode), and that the platinum carried was 0.1 mg/cm$^2$ in the electrocatalyst layer serving as an air electrode (cathode).

[Production of Membrane Electrode Assembly]

A substrate having formed thereon the electrocatalyst layer for an anode and a substrate having formed thereon the electrocatalyst layer for a cathode were punched into square pieces of 5 cm×5 cm, which were transferred to respective surfaces of the polymer electrolyte membrane. That is, the electrocatalyst layer for an anode was transferred to a first surface of the opposed surfaces of the polymer electrolyte membrane, and the electrocatalyst layer for a cathode was transferred to a second surface of the opposed surfaces of the polymer electrolyte membrane. In this case, the transfer temperature was set to 130° C., and the transfer pressure was set to $5.0 \times 10^6$ Pa. Thus, the membrane electrode assembly of Example 1-1 was produced.

Comparative Example 1-1

[Preparation of Catalyst Ink]

A platinum-carrying carbon catalyst (catalyst support particles) with a loading density of 50 mass % and a 25 mass % polymer electrolyte solution were mixed in a solvent and were dispersed in the solvent using a planetary ball mill. The dispersion time was set to 30 minutes to prepare a catalyst ink. The composition ratio of the starting material in the prepared catalyst ink was set as follows. That is, the mass ratio between the carbon carrier and the polymer electrolyte was set to 1:0.7. The solvent in the catalyst ink contained a mixture of ultrapure water and 1-propanol. The volume ratio between ultrapure water and 1-propanol in the solvent was set to 1:1. Further, the catalyst ink was prepared so that the solid content therein was 12 mass %.

[Substrate]

As a substrate constituting a transfer sheet, a polytetrafluoroethylene (PTFE) sheet was used.

[Method of Forming Electrocatalyst Layer on Substrate]

The prepared catalyst ink was applied to the substrate by doctor blading, followed by drying at 80° C. in atmospheric air. The amount of coating of the catalyst ink was controlled so that the platinum carried was 0.05 mg/cm$^2$ in the electrocatalyst layer serving as a fuel electrode (anode), and that the platinum carried was 0.1 mg/cm$^2$ in the electrocatalyst layer serving as an air electrode (cathode).

[Production of Membrane Electrode Assembly]

A substrate having formed thereon the electrocatalyst layer for an anode and a substrate having formed thereon the electrocatalyst layer for a cathode were punched into square pieces of 5 cm×5 cm, which were transferred to respective surfaces of the polymer electrolyte membrane. That is, the electrocatalyst layer for an anode was transferred to a first surface of the opposed surfaces of the polymer electrolyte membrane, and the electrocatalyst layer for a cathode was transferred to a second surface of the opposed surfaces of the polymer electrolyte membrane. In this case, the transfer temperature was set to 130° C., and the transfer pressure was set to $5.0 \times 10^6$ Pa. Thus, the membrane electrode assembly of Comparative Example 1-1 was produced.

Comparative Example 1-2

[Preparation of Catalyst Ink]

A platinum-carrying carbon catalyst (catalyst support particles) with a loading density of 50 mass %, particulate oxide-based catalytic material (TiONP) having an average particle diameter of 0.1 μm, and a 25 mass % polymer electrolyte solution were mixed in a solvent and were dispersed in the solvent using a planetary ball mill. The dispersion time was set to 30 minutes to prepare a catalyst ink. The composition ratio of the starting material in the prepared catalyst ink was set as follows. That is, the mass ratio between the carbon carrier, the oxide-based catalytic material, and the polymer electrolyte was set to 1:1.5:0.7.

The solvent in the catalyst ink contained a mixture of ultrapure water and 1-propanol. The volume ratio between ultrapure water and 1-propanol in the solvent was set to 1:1. Further, the catalyst ink was prepared so that the solid content therein was 12 mass %.

[Substrate]

As a substrate constituting a transfer sheet, a polytetrafluoroethylene (PTFE) sheet was used.

[Method of Forming Electrocatalyst Layer on Substrate]

The prepared catalyst ink was applied to the substrate by doctor blading, followed by drying at 80° C. in atmospheric air. The amount of coating of the catalyst ink was controlled so that the platinum carried was 0.05 mg/cm$^2$ in the electrocatalyst layer serving as a fuel electrode (anode), and that the platinum carried was 0.1 mg/cm$^2$ in the electrocatalyst layer serving as an air electrode (cathode).

[Production of Membrane Electrode Assembly]

A substrate having formed thereon the electrocatalyst layer for an anode and a substrate having formed thereon the electrocatalyst layer for a cathode were punched into square pieces of 5 cm×5 cm, which were transferred to respective surfaces of the polymer electrolyte membrane. That is, the electrocatalyst layer for an anode was transferred to a first surface of the opposed surfaces of the polymer electrolyte membrane, and the electrocatalyst layer for a cathode was transferred to a second surface of the opposed surfaces of the polymer electrolyte membrane. In this case, the transfer temperature was set to 130° C., and the transfer pressure was set to $5.0 \times 10^6$ Pa. Thus, the membrane electrode assembly of Comparative Example 1-2 was produced.

<Evaluation>

[Power Generation Characteristics]

The membrane electrode assemblies obtained in Example 1-1 and Comparative Examples 1-1 and 1-2 were each bonded to two pieces of carbon paper (gas diffusion layers) to be sandwiched therebetween, thereby preparing samples. The samples were each set in a power generation evaluation cell, and current and voltage were measured using a fuel cell measurement device. The cell temperature during the measurement was set to 65° C., and high humidification and low humidification shown below were set as operating conditions. Hydrogen was used as the fuel gas, and air was used as the oxidant gas. In this case, the flow rate of hydrogen was set so that the hydrogen utilization ratio would be 90%, and the flow rate of air was set so that the oxygen utilization ratio would be 40%. Note that the back pressure was set to 50 kPa.

[Operating Conditions]

Condition 1 (high humidification): Relative humidity was 90% RH for anode, and 80% RH for cathode.

Condition 2 (low humidification): Relative humidity was 90% RH for anode, and 30% RH for cathode.

[Measurement Result]

The polymer electrolyte fuel cell including the membrane electrode assembly of Example 1-1 exhibited superior power generation characteristics under the high humidification operating conditions than the polymer electrolyte fuel cells including the membrane electrode assemblies of Comparative Examples 1-1 and 1-2. Furthermore, it was found that, even under the high humidification operating conditions, the membrane electrode assembly of Example 1-1 exhibited power generation characteristics equivalent to those under the low humidification operating conditions. In particular, the membrane electrode assembly of Example 1-1 exhibited improved power generation characteristics around a current density of 1.5 A/cm$^2$.

It was found that, under the high humidification operating conditions, the cell voltage at a current density of 1.5 A/cm$^2$ in the polymer electrolyte fuel cell including the membrane electrode assembly of Example 1-1 was higher by 0.28 V than the cell voltage at a current density of 1.5 A/cm$^2$ in the membrane electrode assembly of Comparative Example 1-1. It was also found that, under the high humidification operating conditions, the cell voltage at a current density of 1.5 A/cm$^2$ in the polymer electrolyte fuel cell including the membrane electrode assembly of Example 1-1 was higher by 0.24 V than the cell voltage at a current density of 1.5 A/cm$^2$ in the polymer electrolyte fuel cell including the membrane electrode assembly of Comparative Example 1-2.

From the measurement results of the power generation characteristics of the polymer electrolyte fuel cell including the membrane electrode assembly of Example 1-1 and the power generation characteristics of the polymer electrolyte fuel cells including the membrane electrode assemblies of Comparative Examples 1-1 and 1-2, it was found that the membrane electrode assembly of Example 1-1 had improved drainage and thus exhibited power generation characteristics under the high humidification operating conditions equivalent to those under the low humidification operating conditions.

Furthermore, it was found that, under the low humidification operating conditions, the cell voltage at a current density of 1.5 A/cm$^2$ in the polymer electrolyte fuel cell including the membrane electrode assembly of Example 1-1 was higher by 0.31 V than the cell voltage at a current density of 1.5 A/cm$^2$ in the polymer electrolyte fuel cell including the membrane electrode assembly of Comparative Example 1-1. It was also found that, under the low humidification operating conditions, the cell voltage at a current density of 1.5 A/cm$^2$ in the polymer electrolyte fuel cell including the membrane electrode assembly of Example 1-1 was higher by 0.27 V than the cell voltage at a current density of 1.5 A/cm$^2$ in the polymer electrolyte fuel cell including the membrane electrode assembly of Comparative Example 1-2.

From the measurement results of the power generation characteristics of the polymer electrolyte fuel cell including the membrane electrode assembly of Example 1-1 and the power generation characteristics of the polymer electrolyte fuel cells including the membrane electrode assemblies of Comparative Examples 1-1 and 1-2, it was found that the membrane electrode assembly of Example 1-1 had improved drainage of the water produced by an electrode reaction and did not hinder water retention under the low humidification operating conditions.

Second Embodiment

A second embodiment of the present disclosure will now be described with reference to the accompanying drawings.

The drawings are schematic, and the relationship between the thickness and the planar dimension, the ratio of the thicknesses between layers, and the like are not to scale. The embodiment described below is merely an example of the configurations for embodying the technical idea of the present disclosure, and the technical idea of the present disclosure does not limit the materials, shapes, structures, and the like of the components to those described below. The technical idea of the present disclosure can be modified in various ways within the technical scope defined in the claims.

[Membrane Electrode Assembly]

As shown in FIG. 1, like the membrane electrode assembly 11 according to the first embodiment, the membrane electrode assembly 11 according to the present embodiment includes the polymer electrolyte membrane 1 and the pair of electrocatalyst layers 2 and 3 vertically sandwiching the polymer electrolyte membrane 1.

The electrocatalyst layers 2 and 3 include at least a polymer electrolyte and particles supporting a catalyst which is composed of a noble metal component. At least one of the pair of electrocatalyst layers 2 and 3 (hereinafter, also termed as a first electrocatalyst layer) includes an oxide-based catalytic material and a fibrous material.

The oxide-based catalytic material included in the first electrocatalyst layer includes at least one transition metal element selected from a group consisting of Ta, Nb, Ti, and Zr. The oxide-based catalytic material is preferably a material obtained by introducing phosphorus (P) to a nitride of the at least one transition metal element as a substitutional atom and partially oxidizing the nitride. More preferably, the at least one transition metal element is Ti. That is, the oxide-based catalytic material is composed of a material obtained by partially oxidizing a nitride of the at least one transition metal element including phosphorus (P) as a substitutional atom.

In the first electrocatalyst layer, the ratio (MB/MA) of the mass (MB) of the oxide-based catalytic material to the mass (MA) of the carrier in particles supporting the catalyst is preferably 0.1 or more and 10 or less, and more preferably 0.8 or more and 4 or less.

In the first electrocatalyst layer, the ratio (MC/MA) of the mass (MC) of the polymer electrolyte to the mass (MA) of the carrier in the particles supporting the catalyst is preferably 0.2 or more and 2.8 or less, and more preferably 0.6 or more and 1.2 or less.

In the first electrocatalyst layer, the ratio (MD/MA) of the mass (MD) of the fibrous material to the mass (MA) of the carrier in the particles supporting the catalyst is preferably 0.05 or more and 1.0 or less, and more preferably 0.1 or more and 0.4 or less.

The particles supporting the catalyst composed of a noble metal component in the first electrocatalyst layer are preferably covered with a hydrophobic coating.

The inventor of the present application found that the first electrocatalyst layer configured as below has good drainage. The detailed mechanism for the first electrocatalyst layer to have good drainage is believed to be as follows. Note that the present invention is not constrained by the mechanism set forth below.

In the first electrocatalyst layer, the fibrous material is entangled, thereby inhibiting the occurrence of cracking in the electrocatalyst layer, which may otherwise decrease the durability of the first electrocatalyst layer. This provides a first electrocatalyst layer having high durability and good mechanical properties. Additionally, the particles supporting the catalyst composed of a noble metal component, the oxide-based catalytic material, and the fibrous material are entangled to form pores in the electrocatalyst layer. When the polymer electrolyte fuel cell including the first electrocatalyst layer is driven in a high current range, the pores drain the water produced by an electrode reaction, which presumably enhances the diffusion of the reaction gas. In the first electrocatalyst layer without the fibrous material, the particles supporting the catalyst composed of a noble metal component are not entangled with the oxide-based catalytic material. Thus, pores are less likely to be formed in the electrocatalyst layer. This hinders the drainage of the water produced by an electrode reaction. Consequently, when the polymer electrolyte fuel cell including the electrocatalyst layers is driven in a high current range, the diffusion of the reaction gas presumably cannot be enhanced.

The fibrous material having an average fiber length of less than 1 μm presumably may impair the mechanical properties of the electrocatalyst layer. The fibrous material having an average fiber length exceeding 15 μm presumably may fail to be dispersed in an ink. That is, the fibrous material having an average fiber length of 1 μm or more inhibits impairing the mechanical properties of the electrocatalyst layer. The fibrous material having an average fiber length of 15 μm or less is easily dispersed in the ink for forming the electrocatalyst layer.

When the mass of the oxide-based catalytic material is less than 0.1 times the mass of the carrier in the catalyst support particles, it presumably may be difficult to obtain a sufficient current due to low catalytic activity of the oxide-based catalytic material. That is, when the ratio of the mass of the oxide-based catalytic material to the mass of the carrier in the particles supporting the catalyst is 0.1 or more, the catalytic activity of the oxide-based catalytic material is inhibited from being decreased, which enables generation of a sufficient current.

When the above ratio exceeds 10, the current presumably may be decreased due to an increased thickness of the electrocatalyst layer. That is, when the ratio of the mass of the oxide-based catalytic material to the mass of the carrier in the particles supporting the catalyst is 10 or less, the thickness of the electrocatalyst layer is inhibited from being excessively increased, which inhibits a reduction in the current.

When the mass of the polymer electrolyte is less than 0.2 times the mass of the carrier in the catalyst support particles, it presumably may be difficult to obtain a sufficient current due to a decrease in the proton conductivity of the electrocatalyst layer. That is, when the mass of the polymer electrolyte is 0.2 or more of the mass of the carrier in the particles supporting the catalyst, the proton conductivity of the electrocatalyst layer is inhibited from being decreased, which enables generation of a sufficient current.

When the mass of the polymer electrolyte exceeds 2.8 times the mass of the carrier in the particles supporting the catalyst, the diffusion of the reaction gas presumably may not be enhanced due to a decrease in the volume of the pores formed in the electrocatalyst layer. That is, when the mass of the polymer electrolyte is 2.8 times or less of the mass of the carrier in the particles supporting the catalyst, a decrease in the volume of pores in the electrocatalyst layer is inhibited, which enhances the diffusion of the reaction gas.

The mass of the fibrous material being less than 0.05 times the mass of the carrier in the catalyst support particles presumably may impair the mechanical properties of the electrocatalyst layer. That is, when the ratio of the mass of the fibrous material is 0.05 or more of the mass of the carrier in the particles supporting the catalyst, the mechanical properties of the electrocatalyst layer are inhibited from being impaired. When the above ratio exceeds 1.0, the current presumably may be decreased due to an increased thickness of the electrocatalyst layer. That is, when the ratio of the mass of the fibrous material to the mass of the carrier in the particles supporting the catalyst is 1.0 or less, the thickness of the electrocatalyst layer is inhibited from being excessively increased, which inhibits a reduction in the current.

According to the membrane electrode assembly 11 of the present embodiment, the power generation characteristics are not impaired by an increase in the interface resistance unlike in the case of using a conventional method of enhancing drainage by changing the configuration of the electrocatalyst layers. Accordingly, the polymer electrolyte fuel cell including the membrane electrode assembly 11 has enhanced power generation characteristics in a high current range where a large amount of water is produced compared with the polymer electrolyte fuel cell including a conventional membrane electrode assembly.

[Polymer Electrolyte Fuel Cell]

The polymer electrolyte fuel cell including the membrane electrode assembly 11 of the present embodiment has the structure illustrated in FIG. 2 like the polymer electrolyte fuel cell of the first embodiment.

[Method of Producing Electrocatalyst Layer]

The first electrocatalyst layer and the second electrocatalyst layer different from the first electrocatalyst layer can be produced by the method of producing the electrocatalyst layer described in the first embodiment.

[Details]

The structure, material, production method, and the like described in the details of the first embodiment can be applied to the membrane electrode assembly 11 and the polymer electrolyte fuel cell 12 of the present embodiment.

The fibrous material may, for example, be electron- or proton-conducting fibers. Examples of electron conductive fibers include carbon fibers, carbon nanotubes, carbon nanohorns, and conductive polymer nanofibers. In terms of conductivity and dispersion, carbon nanofibers are preferably used as the fibrous material.

The proton conductive fibers may be any fiber as long as the fiber is obtained by processing the polymer electrolyte having proton conductivity into a fibrous form. That is, the proton conductive fibers are fibers formed of a proton conductive polymer electrolyte. The proton conductive fibers may be formed of, for example, a fluorinated polymer electrolyte or a hydrocarbon polymer electrolyte. Examples of the fluorinated polymer electrolyte include Nafion (registered trademark) manufactured by DuPont, Flemion (registered trademark) manufactured by Asahi Glass Co., Ltd., Aciplex (registered trademark) manufactured by Asahi Kasei Corporation, and Gore Select (registered trademark) manufactured by Gore. Examples of the hydrocarbon polymer electrolyte include electrolytes such as sulfonated polyether ketones, sulfonated polyether sulfones, sulfonated polyether ether sulfones, sulfonated polysulfides, and sulfonated polyphenylenes. Of these materials, Nafion (registered trademark) manufactured by DuPont is preferred to be used as a polymer electrolyte.

For the fibrous material, fibers of the above types may be used singly or in combination of two or more. As the fibrous material, the electron conductive fibers and the proton conductive fibers may be used in combination. The fibrous material preferably includes at least one selected from a group consisting of carbon nanofibers, carbon nanotubes, and electrolyte fibers among the above-mentioned fibrous material.

Advantageous Effects and Others

The present embodiment as above describes the membrane electrode assembly 11 exhibiting high power generation characteristics under high humidification conditions, the method of producing the membrane electrode assembly 11, and the polymer electrolyte fuel cell 12 including the membrane electrode assembly 11. In the electrocatalyst layers 2 and 3 of the membrane electrode assembly 11 of the present embodiment, the entanglement of the fibrous material inhibits the occurrence of cracking in the electrocatalyst layers, which would otherwise impair durability, thus achieving high durability and good mechanical properties thereof.

Furthermore, the entanglement of the catalyst support particles, the oxide-based catalytic material, and the fibrous material forms pores in the electrocatalyst layers. The pores of the electrocatalyst layers drain water produced by an electrode reaction in a high current range when the polymer electrolyte fuel cell is driven and enhance the diffusion of the reaction gas.

The membrane electrode assembly produced through the method of producing the electrocatalyst layer according to the present embodiment has improved drainage in a high current range where a large amount of water is produced without a hindrance to water retention under low humidification conditions and exhibits high power generation characteristics and high durability even under high humidification conditions. Using the method of producing the electrocatalyst layer according to the present embodiment, the membrane electrode assembly as described above can be produced efficiently and easily in an economical manner (i.e., at a low cost).

In other words, the membrane electrode assembly described above is produced by forming the electrocatalyst layers using the catalyst ink obtained by dispersing a platinum-carrying carbon catalyst (catalyst support particles), that is, carbon particles supporting a platinum catalyst, an oxide-based catalytic material, a fibrous material, and a polymer electrolyte in a solvent.

Accordingly, the membrane electrode assembly is produced without involving complicated production processes, and in addition, the use of the electrocatalyst layers produced through the above procedure improves both water retention and reaction gas diffusion. Thus, the electrocatalyst layers are produced without providing special means such as humidifiers, which consequently contributes to cost reduction.

Only one of the electrocatalyst layers 2 and 3 formed on respective surfaces of the polymer electrolyte membrane 1 may be the first electrocatalyst layer. In this case, as described above, the first electrocatalyst layer is preferably an electrocatalyst layer that serves as an air electrode (cathode), or positive electrode, in which water is produced by an electrode reaction.

While the second embodiment of the present disclosure has been described in detail, the disclosure is not necessarily limited to the above embodiment. Modifications not departing from the scope and spirit of the present disclosure are encompassed by the present disclosure.

EXAMPLES

A description will be given of a method of producing the first electrocatalyst layer and the membrane electrode assembly for use in the polymer electrolyte fuel cell according to the present embodiment, through specific examples and comparative examples. The present embodiment should not be limited by the following examples and comparative examples.

In the following examples and comparative examples, the two electrocatalyst layers are both first electrocatalyst layers. As described above, only one of the two electrocatalyst layers may be the first electrocatalyst layer.

Example 2-1

[Preparation of Catalyst Ink]

A platinum-carrying carbon catalyst (catalyst support particles) with a loading density of 50 mass %, an oxide-based catalytic material (TiONP), carbon fibers having an average fiber diameter of 150 nm and an average fiber length of 6 μm, and a 25 mass % polymer electrolyte solution were mixed in a solvent and dispersed in the solvent using a planetary ball mill. The dispersion time was set to 30 minutes to prepare a catalyst ink. The composition ratio of the starting material in the prepared catalyst ink was set as follows. That is, the mass ratio between the carbon carrier, the oxide-based catalytic material, the carbon fibers, and the polymer electrolyte was set to 1:1.4:0.2:0.8. The solvent in the catalyst ink contained a mixture of ultrapure water and 1-propanol. The volume ratio between ultrapure water and 1-propanol in the solvent was set to 1:1. Further, the catalyst ink was prepared so that the solid content therein was 12 mass %.

[Substrate]

As a substrate constituting a transfer sheet, a polytetrafluoroethylene (PTFE) sheet was used.

[Method of Forming Electrocatalyst Layer on Substrate]

The prepared catalyst ink was applied to the substrate by doctor blading, followed by drying at 80° C. in atmospheric air. The amount of coating of the catalyst ink was controlled so that the platinum carried was 0.05 mg/cm$^2$ in the electrocatalyst layer serving as a fuel electrode (anode), and that the platinum carried was 0.1 mg/cm$^2$ in the electrocatalyst layer serving as an air electrode (cathode).

[Production of Membrane Electrode Assembly]

A substrate having formed thereon the electrocatalyst layer for an anode and a substrate having formed thereon the electrocatalyst layer for a cathode were punched into square pieces of 5 cm×5 cm, which were transferred to respective surfaces of the polymer electrolyte membrane. That is, the electrocatalyst layer for an anode was transferred to a first surface of the opposed surfaces of the polymer electrolyte membrane, and the electrocatalyst layer for a cathode was transferred to a second surface of the opposed surfaces of the polymer electrolyte membrane.

In this case, the transfer temperature was set to 130° C., and the transfer pressure was set to 5.0×10$^6$ Pa. Thus, the membrane electrode assembly of Example 2-1 was produced.

Comparative Example 2-1

[Preparation of Catalyst Ink]

A platinum-carrying carbon catalyst (catalyst support particles) with a loading density of 50 mass %, carbon fibers having an average fiber diameter of 150 nm and an average fiber length of 6 μm, and a 25 mass % polymer electrolyte solution were mixed in a solvent and dispersed in the solvent using a planetary ball mill. The dispersion time was set to 30 minutes to prepare a catalyst ink. The composition ratio of the starting material in the prepared catalyst ink was set as follows. That is, the mass ratio between the carbon carrier, the carbon fibers, and the polymer electrolyte was set to 1:0.2:0.8. The solvent in the catalyst ink contained a mixture of ultrapure water and 1-propanol. The volume ratio in the solvent was set to 1:1. Further, the catalyst ink was prepared so that the solid content therein was 12 mass %.

[Substrate]

As a substrate constituting a transfer sheet, a polytetrafluoroethylene (PTFE) sheet was used.

[Method of Forming Electrocatalyst Layer on Substrate]

The prepared catalyst ink was applied to the substrate by doctor blading, followed by drying at 80° C. in atmospheric air. The amount of coating of the catalyst ink was controlled so that the platinum carried was 0.05 mg/cm² in the electrocatalyst layer serving as a fuel electrode (anode), and that the platinum carried was 0.1 mg/cm² in the electrocatalyst layer serving as an air electrode (cathode).

[Production of Membrane Electrode Assembly]

A substrate having formed thereon the electrocatalyst layer for an anode and a substrate having formed thereon the electrocatalyst layer for a cathode were punched into square pieces of 5 cm×5 cm, which were transferred to respective surfaces of the polymer electrolyte membrane. That is, the electrocatalyst layer for an anode was transferred to a first surface of the opposed surfaces of the polymer electrolyte membrane, and the electrocatalyst layer for a cathode was transferred to a second surface of the opposed surfaces of the polymer electrolyte membrane. In this case, the transfer temperature was set to 130° C., and the transfer pressure was set to 5.0×10⁶ Pa. Thus, the membrane electrode assembly of Comparative Example 2-1 was produced.

Comparative Example 2-2

[Preparation of Catalyst Ink]

A platinum-carrying carbon catalyst (catalyst support particles) with a loading density of 50 mass %, an oxide-based catalytic material (TiONP), and a 25 mass % polymer electrolyte solution were mixed in a solvent and dispersed in the solvent using a planetary ball mill. The dispersion time was set to 30 minutes to prepare a catalyst ink. The composition ratio of the starting material in the prepared catalyst ink was set as follows. That is, the mass ratio between the carbon carrier, the oxide-based catalytic material, and the polymer electrolyte was set to 1:1.4:0.8. The solvent in the catalyst ink contained a mixture of ultrapure water and 1-propanol. The volume ratio between ultrapure water and 1-propanol in the solvent was set to 1:1. Further, the catalyst ink was prepared so that the solid content therein was 12 mass %.

[Substrate]

As a substrate constituting a transfer sheet, a polytetrafluoroethylene (PTFE) sheet was used.

[Method of Forming Electrocatalyst Layer on Substrate]

The prepared catalyst ink was applied to the substrate by doctor blading, followed by drying at 80° C. in atmospheric air. The amount of coating of the catalyst ink was controlled so that the platinum carried was 0.05 mg/cm² in the electrocatalyst layer serving as a fuel electrode (anode), and that the platinum carried was 0.1 mg/cm² in the electrocatalyst layer serving as an air electrode (cathode).

[Production of Membrane Electrode Assembly]

A substrate having formed thereon the electrocatalyst layer for an anode and a substrate having formed thereon the electrocatalyst layer for a cathode were punched into square pieces of 5 cm×5 cm, which were transferred to respective surfaces of the polymer electrolyte membrane. That is, the electrocatalyst layer for an anode was transferred to a first surface of the opposed surfaces of the polymer electrolyte membrane, and the electrocatalyst layer for a cathode was transferred to a second surface of the opposed surfaces of the polymer electrolyte membrane. In this case, the transfer temperature was set to 130° C., and the transfer pressure was set to 5.0×10⁶ Pa. Thus, the membrane electrode assembly of Comparative Example 2-2 was produced.

<Evaluation>

[Power Generation Characteristics]

The membrane electrode assemblies obtained in Example 2-1 and Comparative Examples 2-1 and 2-2 were each bonded to two pieces of carbon paper (gas diffusion layers) to be sandwiched therebetween, thereby preparing samples. The samples were each set in a power generation evaluation cell, and current and voltage were measured using a fuel cell measurement device. The cell temperature during the measurement was set to 65° C., and high humidification and low humidification shown below were set as operating conditions. Hydrogen was used as the fuel gas, and air was used as the oxidant gas. In this case, the flow rate of hydrogen was set so that the hydrogen utilization ratio would be 90%, and the flow rate of air was set so that the oxygen utilization ratio would be 40%. Note that the back pressure was set to 50 kPa.

[Operating Conditions]

Condition 1 (high humidification): Relative humidity was 90% RH for anode, and 80% RH for cathode.

Condition 2 (low humidification): Relative humidity was 90% RH for anode, and 30% RH for cathode.

[Measurement Result]

The polymer electrolyte fuel cell including the membrane electrode assembly of Example 2-1 exhibited superior power generation characteristics under the high humidification operating conditions than the polymer electrolyte fuel cells including the membrane electrode assemblies of Comparative Examples 2-1 and 2-2. Furthermore, even under the high humidification operating conditions, the membrane electrode assembly of Example 2-1 exhibited power generation characteristics of a level equivalent to the power generation characteristics under the low humidification operating conditions. In particular, the membrane electrode assembly of Example 2-1 exhibited improved power generation characteristics around a current density of 1.5 A/cm².

It was found that, under the high humidification operating conditions, the cell voltage at a current density of 1.5 A/cm² in the polymer electrolyte fuel cell including the membrane electrode assembly of Example 2-1 was higher by 0.26 V than the cell voltage at a current density of 1.5 A/cm² in the polymer electrolyte fuel cell including the membrane electrode assembly of Comparative Example 2-1. It was found that, under the high humidification operating conditions, the cell voltage at a current density of 1.5 A/cm² in the polymer electrolyte fuel cell including the membrane electrode assembly of Example 2-1 was higher by 0.22 V than the cell voltage at a current density of 1.5 A/cm² in the polymer electrolyte fuel cell including the membrane electrode assembly of Comparative Example 2-2.

Fm the measurement results of the power generation characteristics of the polymer electrolyte fuel cell including the membrane electrode assembly of Example 2-1 and the power generation characteristics of the polymer electrolyte fuel cells including the membrane electrode assemblies of Comparative Examples 2-1 and 2-2, it was found that the membrane electrode assembly of Example 2-1 had improved drainage and thus exhibited power generation characteristics under the high humidification operating conditions equivalent to those under the low humidification operating conditions.

Furthermore, it was found that, under the low humidification operating conditions, the cell voltage at a current density of 1.5 A/cm² in the polymer electrolyte fuel cell including the membrane electrode assembly of Example 2-1 was higher by 0.28 V than the cell voltage at a current density of 1.5 A/cm² in the polymer electrolyte fuel cell including the membrane electrode assembly of Comparative Example 2-1. Furthermore, it was found that, under the low humidification operating conditions, the cell voltage at a current density of 1.5 A/cm² in the polymer electrolyte fuel cell including the membrane electrode assembly of Example 2-1 was higher by 0.24 V than the cell voltage at a current density of 1.5 A/cm² in the polymer electrolyte fuel cell including the membrane electrode assembly of Comparative Example 2-2.

From the measurement results of the power generation characteristics of the polymer electrolyte fuel cell including the membrane electrode assembly of Example 2-1 and the power generation characteristics of the polymer electrolyte fuel cells including the membrane electrode assemblies of Comparative Examples 2-1 and 2-2, it was found that the membrane electrode assembly of Example 2-1 had improved drainage of the water produced by an electrode reaction and does not hinder water retention under the low humidification conditions.

What is claimed is:

1. A fuel cell membrane electrode assembly, comprising:
a polymer electrolyte membrane; and
a pair of electrocatalyst layers arranged to have the polymer electrolyte membrane located therebetween, wherein
at least one of the pair of electrocatalyst layers includes particles, a polymer electrolyte, and a fibrous oxide-based catalytic material, the particles supporting a catalyst that comprises a noble metal component, and
the fibrous oxide-based catalytic material includes at least one transition metal element selected from the group consisting of Ta, Nb, Ti, and Zr, wherein the fibrous oxide-based catalytic material is a material comprised of a partially oxidized nitride of the at least one transition metal element, the partially oxidized nitride of the at least one transition metal element including phosphorus (P) as a substitutional atom.

2. The fuel cell membrane electrode assembly of claim 1, wherein the at least one of the pair of electrocatalyst layers including the particles, the polymer electrolyte, and the fibrous oxide-based catalytic material includes an electrocatalyst layer for a positive electrode of a polymer electrolyte fuel cell.

3. The fuel cell membrane electrode assembly of claim 1, wherein the at least one transition metal element is Ti.

4. The fuel cell membrane electrode assembly of claim 1, wherein the fibrous oxide-based catalytic material has an average fiber diameter of 20 nm or more and 1 μm or less and an average fiber length of 1.2 μm or more and 30 μm or less.

5. The fuel cell membrane electrode assembly of claim 1, wherein the particles supporting the catalyst comprising the noble metal component include a carrier, the catalyst is supported on the carrier, and a ratio of MB to MA is 0.1 or more and 10 or less, where:
MB represents a mass of the fibrous oxide-based catalytic material; and
MA represents a mass of the carrier in the particles.

6. The fuel cell membrane electrode assembly of claim 1, wherein the particles supporting the catalyst comprising the noble metal component include a carrier, the catalyst is supported on the carrier, and a ratio of MC to MA is 0.1 or more and 1.4 or less, where:
MC represents a mass of the polymer electrolyte; and
MA represents a mass of the carrier in the particles.

7. The fuel cell membrane electrode assembly of claim 1, wherein the particles supporting the catalyst comprising the noble metal component are covered with a hydrophobic coating.

8. A polymer electrolyte fuel cell, comprising:
the fuel cell membrane electrode assembly of claim 1;
a pair of gas diffusion layers arranged to have the fuel cell membrane electrode assembly located therebetween; and
a pair of separators arranged to have the pair of gas diffusion layers located therebetween.

9. A fuel cell membrane electrode assembly, comprising:
a polymer electrolyte membrane; and
a pair of electrocatalyst layers arranged to have the polymer electrolyte membrane located therebetween, wherein
at least one of the pair of electrocatalyst layers includes particles, a polymer electrolyte, and a fibrous oxide-based catalytic material, the particles supporting a catalyst that comprises a noble metal component, and
the fibrous oxide-based catalytic material includes at least one transition metal element selected from the group consisting of Ta, Nb, Ti, and Zr, wherein the fibrous oxide-based catalytic material has an average fiber diameter of 20 nm or more and 1 μm or less and an average fiber length of 1.2 μm or more and 30 μm or less.

10. The fuel cell membrane electrode assembly of claim 9, wherein the at least one of the pair of electrocatalyst layers including the particles, the polymer electrolyte, and the fibrous oxide-based catalytic material includes an electrocatalyst layer for a positive electrode of a polymer electrolyte fuel cell.

11. The fuel cell membrane electrode assembly of claim 9, wherein the at least one transition metal element is Ti.

12. The fuel cell membrane electrode assembly of claim 9, wherein the particles supporting the catalyst comprising the noble metal component include a carrier, the catalyst is supported on the carrier, and a ratio of MB to MA is 0.1 or more and 10 or less, where:
MB represents a mass of the fibrous oxide-based catalytic material; and
MA represents a mass of the carrier in the particles.

13. The fuel cell membrane electrode assembly of claim 9, wherein the particles supporting the catalyst comprising the noble metal component include a carrier, the catalyst is supported on the carrier, and a ratio of MC to MA is 0.1 or more and 1.4 or less, where:
MC represents a mass of the polymer electrolyte; and
MA represents a mass of the carrier in the particles.

14. The fuel cell membrane electrode assembly of claim 9, wherein the particles supporting the catalyst comprising the noble metal component are covered with a hydrophobic coating.

15. A polymer electrolyte fuel cell, comprising:
the fuel cell membrane electrode assembly of claim 9;
a pair of gas diffusion layers arranged to have the fuel cell membrane electrode assembly located therebetween; and
a pair of separators arranged to have the pair of gas diffusion layers located therebetween.

16. A fuel cell membrane electrode assembly, comprising:
a polymer electrolyte membrane; and
a pair of electrocatalyst layers arranged to have the polymer electrolyte membrane located therebetween, wherein
at least one of the pair of electrocatalyst layers includes particles, a polymer electrolyte, and a fibrous oxide-based catalytic material, the particles supporting a catalyst that comprises a noble metal component, and the fibrous oxide-based catalytic material includes at least one transition metal element selected from the group consisting of Ta, Nb, Ti, and Zr, wherein the particles supporting the catalyst comprising the noble metal component include a carrier, the catalyst is supported on the carrier, and a ratio of MB to MA is 0.1 or more and 10 or less, where:

MB represents a mass of the fibrous oxide-based catalytic material; and

MA represents a mass of the carrier in the particles.

17. The fuel cell membrane electrode assembly of claim 16, wherein the at least one of the pair of electrocatalyst layers including the particles, the polymer electrolyte, and the fibrous oxide-based catalytic material includes an electrocatalyst layer for a positive electrode of a polymer electrolyte fuel cell.

18. The fuel cell membrane electrode assembly of claim 16, wherein the at least one transition metal element is Ti.

19. The fuel cell membrane electrode assembly of claim 16, wherein the particles supporting the catalyst comprising the noble metal component include a carrier, the catalyst is supported on the carrier, and a ratio of MC to MA is 0.1 or more and 1.4 or less, where:

MC represents a mass of the polymer electrolyte; and

MA represents a mass of the carrier in the particles.

20. The fuel cell membrane electrode assembly of claim 16, wherein the particles supporting the catalyst comprising the noble metal component are covered with a hydrophobic coating.

* * * * *